United States Patent
Keller et al.

(10) Patent No.: US 11,327,986 B2
(45) Date of Patent: May 10, 2022

(54) RETRIEVING AND PRESENTING DATA IN A STRUCTURED VIEW FROM A NON-RELATIONAL DATABASE

(71) Applicant: International Business Machines Corporation, Armonk, NY (US)

(72) Inventors: Nicholas Joseph Keller, Acworth, GA (US); Arvin Bhatnagar, Cary, NC (US); Jason Howard Cornpropst, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 89 days.

(21) Appl. No.: 16/908,598

(22) Filed: Jun. 22, 2020

(65) Prior Publication Data

US 2021/0397608 A1   Dec. 23, 2021

(51) Int. Cl.
*G06F 16/248* (2019.01)
*G06F 16/25* (2019.01)
*G06Q 10/10* (2012.01)
*G06F 16/22* (2019.01)

(52) U.S. Cl.
CPC ........ *G06F 16/248* (2019.01); *G06F 16/2237* (2019.01); *G06F 16/2282* (2019.01); *G06F 16/258* (2019.01); *G06Q 10/10* (2013.01)

(58) Field of Classification Search
None
See application file for complete search history.

(56) References Cited

U.S. PATENT DOCUMENTS

| | | | |
|---|---|---|---|
| 6,928,431 B2 | 8/2005 | Dettinger et al. | |
| 7,231,396 B2 | 6/2007 | Ayachitula et al. | |
| 8,914,414 B2 | 12/2014 | Jacobson et al. | |
| 2009/0150866 A1* | 6/2009 | Schmidt | G06Q 50/18 717/120 |
| 2009/0150906 A1* | 6/2009 | Schmidt | G06Q 50/18 719/317 |
| 2012/0158813 A1 | 6/2012 | Kumar et al. | |
| 2012/0310969 A1* | 12/2012 | Heidasch | G06F 16/367 707/769 |

(Continued)

OTHER PUBLICATIONS

"IBM Financial Crimes Insight with Watson Due Diligence—Rapid Deploy Service provides a faster return on investment while reducing risk", IBM United States Software Announcement 219-327, dated Jul. 2, 2019, 5 pages, Evidence of Grace Period Use or Sale.

(Continued)

*Primary Examiner* — Kim T Nguyen
(74) *Attorney, Agent, or Firm* — Sonny Z. Zhan (57) ABSTRACT

In an approach for retrieving and presenting data in a structured view from a database, a processor receives a request from a user for accessing data in the database based on a business object. The business object may be a configuration file that defines the data and how the data is to be retrieved from the database. A processor retrieves the business object. A processor determines, based on the business object, a location in the database to get the data. A processor retrieves the data from the database based on the business object. A processor formats the data based on the business object. A processor performs a post process on the data based on the business object. A processor returns the data to the user.

14 Claims, 7 Drawing Sheets

(56) References Cited

U.S. PATENT DOCUMENTS

| | | | |
|---|---|---|---|
| 2013/0166610 A1* | 6/2013 | Klemenz | G06F 8/30 |
| | | | 707/822 |
| 2014/0007136 A1* | 1/2014 | Bettin | G06F 9/541 |
| | | | 719/313 |
| 2016/0196516 A1 | 7/2016 | Anisingaraju et al. | |
| 2016/0267132 A1 | 9/2016 | Castellanos et al. | |
| 2017/0288939 A1 | 10/2017 | Massaguer et al. | |
| 2021/0120044 A1* | 4/2021 | Balan | G06F 21/6227 |
| 2021/0397608 A1* | 12/2021 | Keller | G06F 16/2282 |

OTHER PUBLICATIONS

Goyal et al., "An Overview of Hybrid Databases", Proceedings of the 2015 International Conference on Green Computing and Internet of Things (ICGCIoT), Oct. 8-10, 2015, Noida, India, pp. 285-288.

* cited by examiner

```
{
    "sysref": "srHBase",
    "logicalObjectDisplayName": "Auto Policies",
    "logicalObjectName": "Auto Policies",
    "cfObjectStereoType": "business_object",
    "tableName": "Auto_Policies",
    "postProcess": [
        {
            "action": "mergeFields",
            "data": [
                {
                    "outputField": "Name 1",
                    "arrayOrGroupName": "Insured",
                    "prominence": 6,
                    "sourceFields": [
                        {
                            "logicalField": "Insured Legal Name 1"
                        }
                    ]
                },
                {
                    "outputField": "Name 2",
                    "arrayOrGroupName": "Insured",
                    "prominence": 6,
                    "sourceFields": [
                        {
                            "logicalField": "Insured Legal Name 2"
                        }
                    ]
                }
            ]
        }
    ],
    "definition": {
        "columns": [
            {
                "logicalField": "Policy Number",
                "physicalField": "f:POLICY_ID"
            }
        ],
        "joinedTables": [
            {
                "tableKeyId": "pf:externalRegisteredNumber",
                "tableName": "party",
                "localKeyId": "f:CUSTOMER_ID",
                "columns": [
                    {
                        "logicalField": "External ID",
                        "physicalField": "pf:externalRegisteredNumber",
                        "prominence": -1,
                        "required": true
                    }
                ]
            }
        ]
    }
}
```

RETRIEVING AND PRESENTING DATA IN A STRUCTURED VIEW FROM A NON-RELATIONAL DATABASE

STATEMENT REGARDING PRIOR DISCLOSURES BY THE INVENTOR OR A JOINT INVENTOR

The following disclosure(s) are submitted under 35 U.S.C. 102(b)(1)(A): DISCLOSURE(S): IBM United States Software Announcement 219-327, dated Jul. 2, 2019, 5 pages.

BACKGROUND

The present disclosure relates generally to the field of the field of database management, and more particularly to retrieving and presenting data in a structured view from a database.

A database may be an organized collection of data, generally stored and accessed electronically from a computer system. A non-relational database is a database that does not use a tabular schema of rows and columns found in most traditional database systems. Instead, non-relational databases may use a storage model that is optimized for the specific requirements of the type of data being stored. For example, data may be stored as simple key/value pairs, as JavaScript Object Notation (JSON) documents, or as a graph consisting of edges and vertices.

SUMMARY

Aspects of an embodiment of the present disclosure disclose an approach for retrieving and presenting data in a structured view from a database. A processor receives a request from a user for accessing data in the database based on a business object. The business object may be a configuration file that defines the data and how the data is to be retrieved from the database. A processor retrieves the business object. A processor determines, based on the business object, a location in the database to get the data. A processor retrieves the data from the database based on the business object. A processor formats the data based on the business object. A processor performs a post process on the data based on the business object. A processor returns the data to the user.

DETAILED DESCRIPTION

The present disclosure is directed to systems and methods for retrieving and presenting data in a structured view from a database.

Embodiments of the present disclosure recognize a need to access unstructured data in a structured form from a database. Embodiments of the present disclosure disclose an approach to support configurable views, representations, and linkages of data from a non-relational database. Embodiments of the present disclosure disclose a structured view of the underlying data without changing the underlying data. Embodiments of the present disclosure disclose a business object that is a configuration file describing what data to be retrieved from a database by a user. Each user may define the business object per a specified request from each user. The business object may define a name to use for a field of the data to be retrieved from the database. For example, the business object can specify a data field to fetch data in the database and specify a field name for the data to be fetched for the user. The business object may provide definitions to create a structured view of an underlying unstructured data in the database. For example, when a user (e.g., an application) calls to access certain data in the database, the business object can be created to provide a structured view of an underlying unstructured data per the user's request. In an example, the business object can be created and defined in a JSON format.

In one or more embodiments, a business object may be registered with a data engine. The data engine may store the business object and the definitions in the business object into a storage. Each business object may have a unique name and a numeric identifier. Once the business object is registered with the data engine, a user can make a data request through the data engine based on the business object. The data engine may accept a data access request defined in the business object. The data engine may examine the definitions in the business object to determine where to fetch the data from the database. The data engine may fetch the data and may return the data to the user using the field names specified in the definitions of business object. The data engine may present a structured view of the unstructured data.

Figure 1:
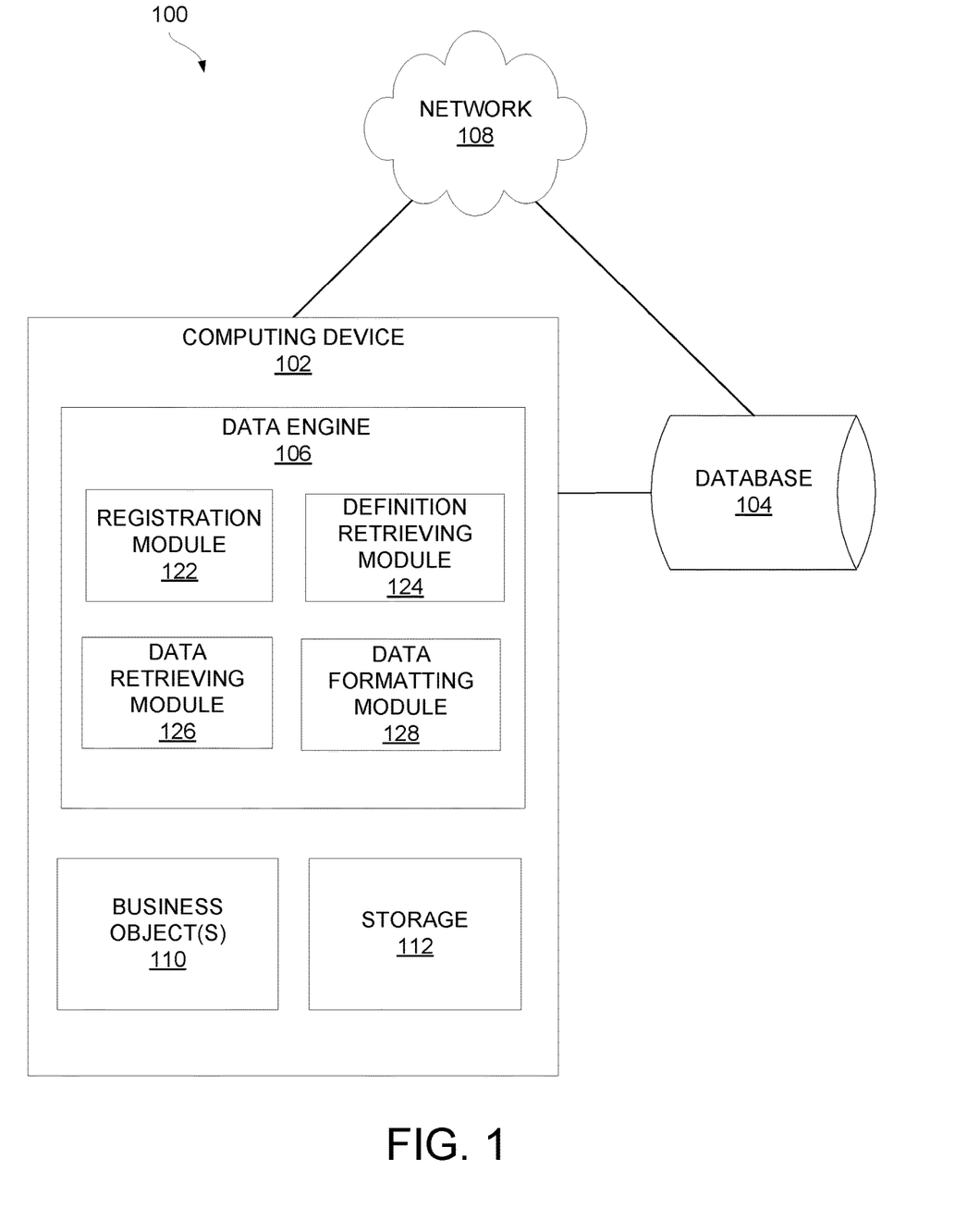
FIG. 1 is a functional block diagram illustrating a database data retrieving environment, in accordance with an embodiment of the present disclosure.

The present disclosure will now be described in detail with reference to the Figures. FIG. 1 is a functional block diagram illustrating database data retrieving environment, generally designated 100, in accordance with an embodiment of the present disclosure.

In the depicted embodiment, database data retrieving environment 100 includes computing device 102, database 104, and network 108. Database 104 may include a set of tables with rows and columns. Database 104 may include various types of data, for example, numeric data, binary data, strings, arrays, maps, enumerations and records. Database 104 may allow for attributes to be grouped together into column families, such that the elements of a column family are stored together. In one embodiment, database 104 may be a non-relational database. In other embodiments, database 104 may be a relational database or any other suitable database. In the depicted embodiment, database 104 is located externally to computing device 102. Database 104 may be accessed directly by computing device 102 or through a communication network such as network 108. However, in other embodiments, database 104 may be located on computing device 102.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to data engine 106, business object(s) 110, storage 112, database 104, and network 108 and is capable of processing program instructions and executing data engine 106 and business object(s) 110, in accordance with an embodiment of the present disclosure. Computing device 102 may include internal and external hardware components, as depicted and described in further detail with respect to FIG. 7.

Further, in the depicted embodiment, computing device 102 includes data engine 106, business object(s) 110, and storage 112. In the depicted embodiment, data engine 106, business object(s) 110, and storage 112 are located on computing device 102. However, in other embodiments, data engine 106, business object(s) 110, and storage 112 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and data engine 106, business object(s) 110, and storage 112, in accordance with a desired embodiment of the disclosure.

Figure 3:
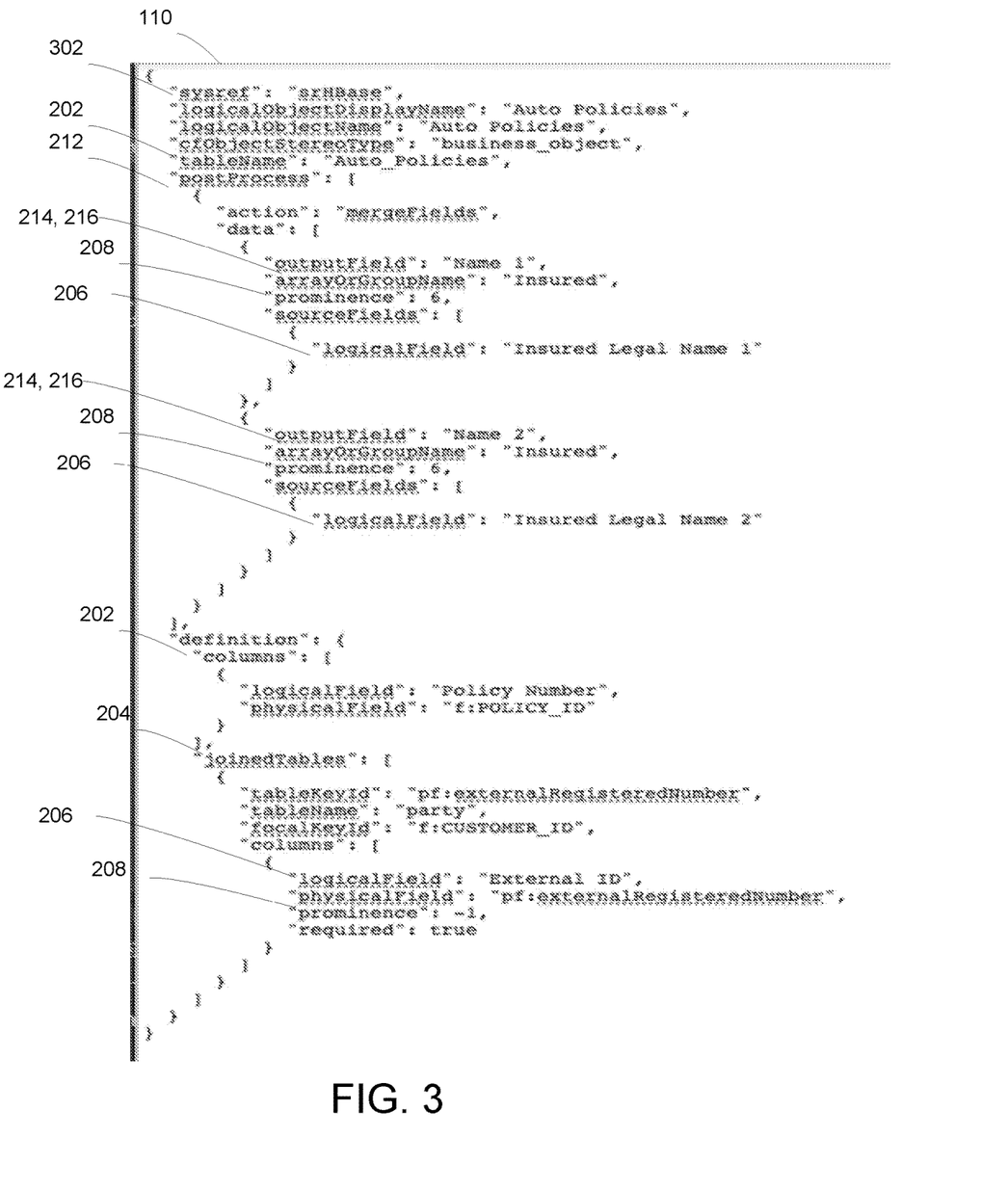
FIG. 3 illustrates an example of the business object in an example JSON format included in the computing device of FIG. 1, in accordance with an embodiment of the present disclosure.

In one or more embodiments, business object 110 is a configuration file that defines what data and how the data to be retrieved from database 104 by a user. Business object 110 may be defined per the user. Business object 110 may define a name to use for a field of the data to be retrieved from database 104 for a user. For example, business object 110 can specify a data field to fetch data in database 104 and specify a field name for the data to be fetched for the user. Business object 110 may provide definitions to create a structured view of an unstructured data in database 104. For example, when a user (e.g., an application) calls to access certain data in database 104, business object 110 can provide a structured view of an underlying unstructured data per the user's request. In an example, business object 110 can be configured in a JSON format. JSON can be a data interchange format storing and transmitting data objects consisting of attribute-value pairs and array data types. An example of business object 110 in a JSON format is illustrated in FIG. 3. Business object 110 may be registered with data engine 106. Data engine 106 may store business object 110 and definitions of business object 110 into storage 112. Each business object 110 may have a unique name and a numeric identifier. Data engine 106 may accept requests for data access defined in business object 110. Data engine 106 may examine the definitions defined in business object 110 to determine where to fetch the data in database 104. Data engine 106 may fetch the data and may return the data to the user using the field names specified in the definitions of business object 110. Data engine 106 may present a structured view of the data retrieved from database 104 to a user.

Figure 2:
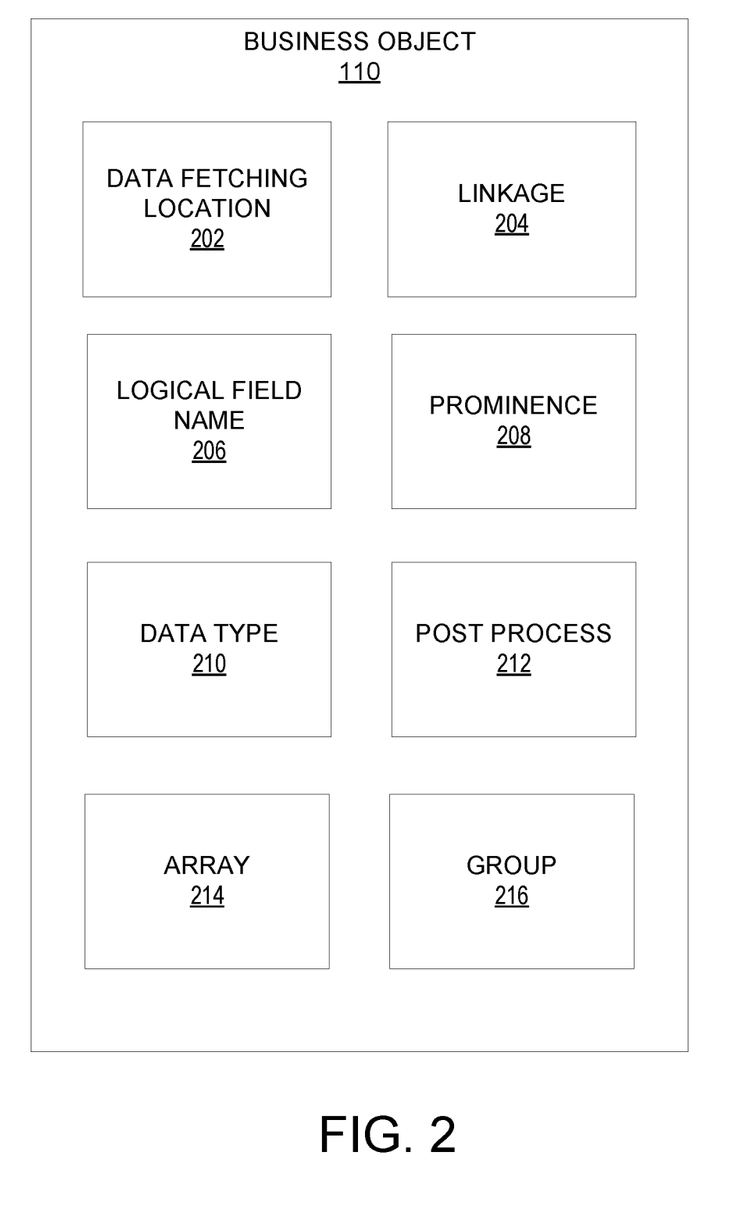
FIG. 2 illustrates an example component diagram of a business object included in a computing device of FIG. 1, in accordance with an embodiment of the present disclosure.

In one or more embodiments, business object 110 may define how data (e.g., unstructured data) in database 104 is to be viewed by a user. Business object 110 may specify a location (e.g., what tables and columns) to use to get the data. Business object 110 may define a field name the data should be returned. Business object 110 may define linkages between tables for the data to be fetched. Business object 110 may define a prominence for each data field of the data to be fetched. Each field in business object 110 can be assigned a prominence level. The prominence of a field may correlate to a level of detail of the data. Business object 110 may define the prominence to display different levels of detail of the data. Business object 110 may define a data type for a data field. Business object 110 may use the data type to identify a field as a given data type. For example, a data type can be set as an integer, float, or other suitable data type. A data type can be an indicator to a certain format of a value of the data field. Business object 110 may support a custom data type per the user's request. Business object 110 may define a post process specifying operations to be performed on the data after the data has been retrieved from database 104, but before the data is returned to the user. Business object 110 may include a set of fields to be returned to the user. Each field has multiple characteristics including, for example, field name and data type. Business object 110 may can include arrays of data values and groups of data values. An array may be a collection of values from another table. A group may be a set of values from one or more tables that may or may not have direct data linkages. An example component diagram of business object 110 is illustrated in FIG. 2.

In the depicted embodiment, data engine 106 includes registration module 122, definition retrieving module 124, data retrieving module 126, and data formatting module 128. Registration module 122 may be configured to register business object 110. For example, when business object 110 is created for a user, business object 110 can be sent to data engine 106 for registration. Data engine 106 may register business object 110 by registration module 122. Data engine 106 may save the definitions in business object 110 to storage 112 after registration module 122 registers business object 110. Definition retrieving module 124 may be configured to retrieve the definitions defined in business object 110 for data access when a user calls to access data from database 104 using business object 110. Data retrieving module 126 may be configured to retrieve the data from database 104 based on the definitions in business object 110 for a user. Data formatting module 128 may be configured to format the data retrieved from database 104. For example, data formatting module 128 may merge and output multiple fields into one field of the retrieved data. Data formatting module 128 may form an array for a collection of data values from multiple tables. Array content can come from multiple tables. The multiple tables with data related to a root table can be formatted in an array based on business object 110. Data formatting module 128 may format a group which includes multiple fields under a single name of the group.

In one or more embodiments, data engine 106 is configured to receive a request from a user for data access to database 104 using a given business object 110. Business object 110 is a configuration file that describes what data to be retrieved from database 104 by the user. Each user may define business object 110 for the user. Business object 110 may define a name to use for a field of the data to be retrieved from database 104 for the user. For example, business object 110 may specify a data field to fetch data in database 104 and may specify a field name for the data to be fetched for the user. Business object 110 may provide definitions to create a structured view of unstructured data in database 104. For example, when a user (e.g., an application) calls to access certain data in database 104, business object 110 can provide a structured view of the unstructured data per the user's request. In an example, business object 110 can be created and defined in a JSON format. The user may call data access to database 104 based on business object 110 created for the user.

In one or more embodiments, data engine 106 is configured to retrieve the definitions defined in business object 110. Each user may define business object 110 for the user. Business object 110 may specify what data to be retrieved from database 104. Business object 110 may define a name to use for a field of the data to be retrieved from database 104. Business object 110 may specify a data field to fetch data in database 104 and specify a field name for the data to be fetched. Business object 110 may provide definitions to create a structured view of an underlying unstructured data in database 104. When the user calls a data access to database 104 based on business object 110, data engine 106 may retrieve the definitions defined in business object 110 from storage 112. Data engine 106 may retrieve the definitions defined in business object 110 for data access when a user calls to access data from database 104 using business object 110.

In one or more embodiments, data engine 106 is configured to determine a location in database 104 to get the data. Data engine 106 may examine the definitions in business object 110 to determine where to fetch the data. For example, data engine 106 may determine what tables and columns to use to retrieve the data based on data location information specified in business object 110 for the user.

In one or more embodiments, data engine 106 is configured to retrieve the data. Data engine 106 may retrieve the data from database 104 based on the definitions in business object 110. Data engine 106 may get the data from the determined tables and columns in database 104. Data engine 106 may get the data based on table linkages as defined in business object 110.

In one or more embodiments, data engine 106 is configured to format the data based on the definitions in business object 110 for the data. Data engine 106 may format the data retrieved from database 104. For example, data engine 106 may merge multiple fields into one field in the retrieved data. In an example, data engine 106 may form an array for a collection of data values from multiple tables. Array content can come from multiple tables. The multiple tables with data related to a root table can be formatted in an array based on business object 110. Data engine 106 may format a group which includes multiple fields under a single name.

In one or more embodiments, data engine 106 is configured to perform a post process on the retrieved data. The post process may include merging multiple data fields into one data field based on the post process defined in business object 110. Other suitable operations can be defined in the post process of business object 110.

In one or more embodiments, data engine 106 is configured to return the data to the user. Data engine 106 may present the data in the view defined in the given business object 110. Data engine 106 may present a structured view of an underlying unstructured data in database 104 to the user based on the definitions defined in business object 110.

FIG. 2 illustrates an example component diagram of business object 110 in accordance with an embodiment of the present disclosure.

In the depicted embodiment, business object 110 may include data fetching location 202, linkage 204, logic field name 206, prominence 208, data type 210, post process 212, array 214, and group 216. Data fetching location 202 may define a location to get the data from database 104. In an example, the location can be what tables and columns to use to retrieve the data. Linkage 204 may define the linkages among the tables to get the data. Logic field name 206 may define what field name the data should be returned for the user using business object 110. Logic field name 206 may define to return a field name in database 104 to the user with a different view name for the user. For example, logic field name 206 may define to return a field name "ID" in database 104 to the user with a different view field name "SSN".

Prominence 208 may define a level of detail to be displayed for a data field of the data. Prominence 208 may allow more or less data information to be displayed. Each field in business object 110 may be assigned a prominence level. The prominence of a field may correlate to level-of-detail. Prominence 208 may be used to display differing levels of detail of the data. In an example, prominence 208 can be pre-defined in a range between a negative number and a positive number. A negative prominence number or zero may indicate to the process invoking data engine 106 to hide the field value from being displayed. Fields tagged with a negative prominence may be returned to the caller but are not displayed. The caller of data engine 106 can use negative prominence fields. A positive prominence number may define a level of details of the data field to be displayed. For example, prominence level one (1) may indicate the least detail of the data to display. The pre-defined maximum prominence level number (n) may indicate the most detail of the data to display for the user. Each data field may be assigned a corresponding prominence level. In an example, if prominence 208 is set as "1" for "name" field, "2" for "zip code" field, and "3" for "street address" in an example business object, a request for the example business object data at prominence=1 would only return the "name" field. A request for data at prominence=2 would return both the "name" and "zip code" fields. A request at prominence=3 would return all three fields ("name", "zip code" and "street address"). In another example, if prominence 208 is set as a negative prominence number or zero in a data field, the data field may be returned to the called but is generally hidden and is not displayed.

Data type 210 may define a data type for a field. Business object 110 may use the data type to identify the field as a given data type. For example, data type 210 can be set as an integer, float, or other suitable data type. Data type 210 can be an indicator to a certain format of a value of the data field. Data type 210 may allow business object 110 to identify a field as a given data type. Example data types may be integer or float which would be an indicator to the user to not allow decimal values, or to allow decimal values. Business object 110 may support custom data types. Example custom data types may be, for example, "ssn" in (nnn-nn-nnnn) format, and "phone number" in (nnn-nnn-nnnn) format.

Post process 212 may specify operations to be performed on the data after the data has been retrieved from database 104, but before the data is returned to the user. Post process 212 may include merging multiple data fields into one data field. Other suitable operations can be defined in post process 212 of business object 110.

Array 214 may define a collection of values from multiple data sources (e.g., tables) in database 104. For example, array 214 can come from multiple tables including a root table. The multiple tables with data related to the root table can be formatted in array 214 based on business object 110. Elements in array 214 may be rooted at the root table.

Group 216 may define multiple fields under a single name. Group 216 may be a set of values from one or more tables that may or may not have direct data linkages. An example usage for group 216 is when a single row of unstructured data contains two or more sets of data that are related. For example, when a data row includes ("name_1", "addr_1", "name_2", "addr_2"), group 216 may define the ("name_1", "addr_1") data type values to be displayed under a field name, e.g., "claimant", with the ("name_2", "addr_2") data type values displayed under another field name, e.g., "agent". The example above is for a row from a single table, but the feature also works with data from multiple tables.

FIG. 3 illustrates an example business object 110 in an example JSON format, in accordance with an embodiment of the present disclosure.

In the example of FIG. 3, the JSON fragment illustrated is a portion of business object definition. For example, a fully formed business object definition may have rows in a "columns" array that corresponds to the columns in the post process section. Post process 212 may indicate what fields to merge, but the fields may still have to be retrieved from database 104 and can be referenced under a "joinedtables" section. In the example, business object 110 specifies database 104, "srHBase" in the example, to fetch data from in 302. Data fetching location 202 specifies a root table, "auto_policies" in the example, to fetch data from. Data fetching location 202 also specifies columns to fetch the data from. Linkage 204 defines the linkages between the tables to get the data. Logic field name 206 defines what field name the data should be returned for the user. Prominence 208 defines a level of detail to be displayed for a data field of the data. Prominence 208 may allow more or less data information to be displayed. In the example, each field is assigned a prominence level. The prominence of a field may correlate to level-of-detail. Post process 212 specifies operations to be performed on the data after the data has been retrieved from database 104, but before the data is returned to the user. In the example, the operations include merging fields. Array 214 defines a collection of values from multiple data sources (e.g., tables) in database 104. Group 216 defines multiple fields under a single name. In the "postprocess" section, the "arrayOrGroupName" tag flag indicates to post process 212 that post process 212 needs to get the source data from an array or group, not from the regular data. The "arrayOrGroupName" identifies which array or group post process 212 should get the data from.

Figure 4:
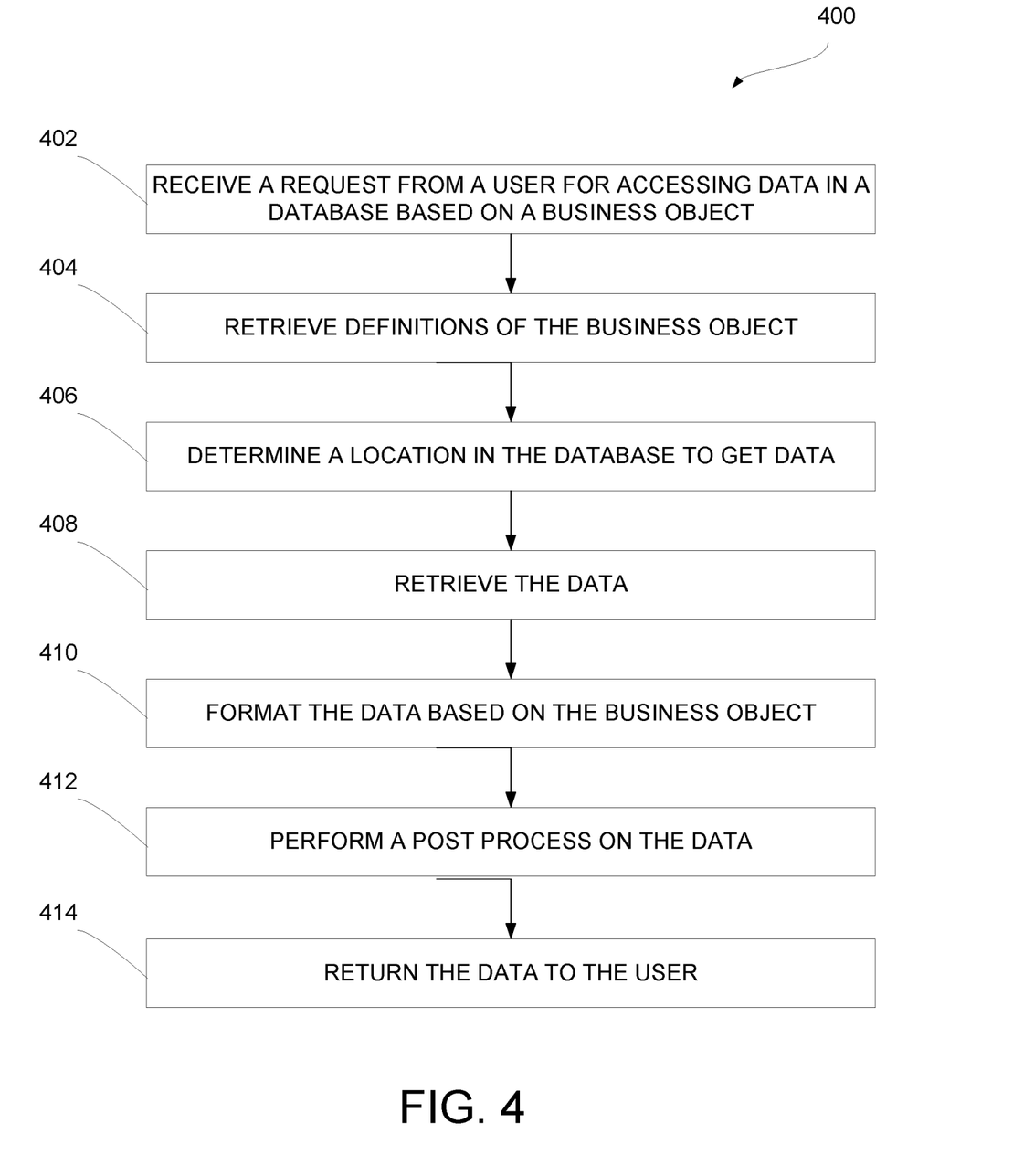
FIG. 4 is a flowchart depicting operational steps of a data engine included in the computing device of FIG. 1, in accordance with an embodiment of the present disclosure.

FIG. 4 is a flowchart 400 depicting operational steps of data engine 106 in accordance with an embodiment of the present disclosure.

Data engine 106 operates to receive a request from a user for accessing data in database 104 based on business object 110. Business object 110 may be a configuration file that defines what data and how the data to be retrieved from database 104 by the user. Data engine 106 also operates to retrieve business object 110. Data engine 106 operates to determine a location in database 104 to get the data. Data engine 106 operates to retrieve the data from database 104 based on business object 110. Data engine 106 operates to format the data based on business object 110. Data engine 106 operates to perform a post process on the data. Data engine 106 operates to return the processed data to the user.

In step 402, data engine 106 receives a request from a user for data access to database 104 based on business object 110. In an example, data engine 106 may receive the request from a user using the name of business object 110. In another example, data engine 106 may receive the request from a user using an identifier of business object 110. Business object 110 is a configuration file that describes what data to be retrieved from database 104 by the user. Business object 110 may define a name to use for a field of the data to be retrieved from database 104 for the user. For example, business object 110 may specify a data field to fetch data in database 104 and may specify a field name for the data to be fetched for the user. Business object 110 may provide definitions to create a structured view of an underlying unstructured data in database 104. For example, when a user (e.g., an application) calls to access certain data in database 104, business object 110 can be created to provide a structured view of an underlying unstructured data per the user's request. In an example, business object 110 can be created and defined in a JSON format. The user may call data engine 106 that accesses database 104 based on business object 110 previously created by the user.

In step 404, data engine 106 retrieves the definitions defined in business object 110. Data engine 106 may retrieve the definitions defined in business object 110 for each business object identifier that the user has provided in step 402. Data engine 106 may retrieve the definition for one or more business object(s) 110 from storage 112. Business object 110 may describe what data to be retrieved from database 104 by the user. Business object 110 may define a name to use for a field of the data to be retrieved from database 104 for the user. Business object 110 may specify a data field to fetch data in database 104 and specify a field name for the data to be fetched for the user. Business object 110 may provide definitions to create a structured view of an underlying unstructured data in database 104. When the user calls a data access to database 104 based on business object 110, data engine 106 may retrieve the definitions defined in business object 110 from storage 112. Data engine 106 may retrieve the definitions defined in business object 110 for data access when a user calls to access data from database 104 using business object 110.

In step 406, data engine 106 determines a location in database 104 to get the data. Data engine 106 may examine the definitions in business object 110 to determine where to fetch the data. For example, data engine 106 may determine what tables and columns to use to retrieve the data based on data location information specified in business object 110 for the user.

In step 408, data engine 106 retrieves the data from database 104 based on business object 110. Data engine 106 may retrieve the data from database 104 based on the definitions in business object 110 for a user. Data engine 106 may get the data from the determined tables and columns in database 104. Data engine 106 may get the data based on table linkages as defined in business object 110 for the user.

In step 410, data engine 106 formats the data based on the definitions in business object 110 for the data. Data engine 106 may format the data retrieved from database 104. For example, data engine 106 may render fields based on a data type specified in business object 110. Data engine 106 may form an array for a collection of data values from multiple tables. Array content can come from multiple tables. The multiple tables with data related to a root table can be formatted in an array based on business object 110. Data engine 106 may format a group which includes multiple fields under a single name.

In step 412, data engine 106 performs a post process on the retrieved data. The post process may include merging multiple data fields into one data field based on the post process defined in business object 110. Other suitable operations can be defined in the post process of business object 110.

In step 414, data engine 106 returns the data to the user. Data engine 106 may present the data in the view defined in the given business object 110. Data engine 106 may present a structured view of an underlying unstructured data in database 104 to the user based on the definitions pre-defined by the user in business object 110.

Figure 5:
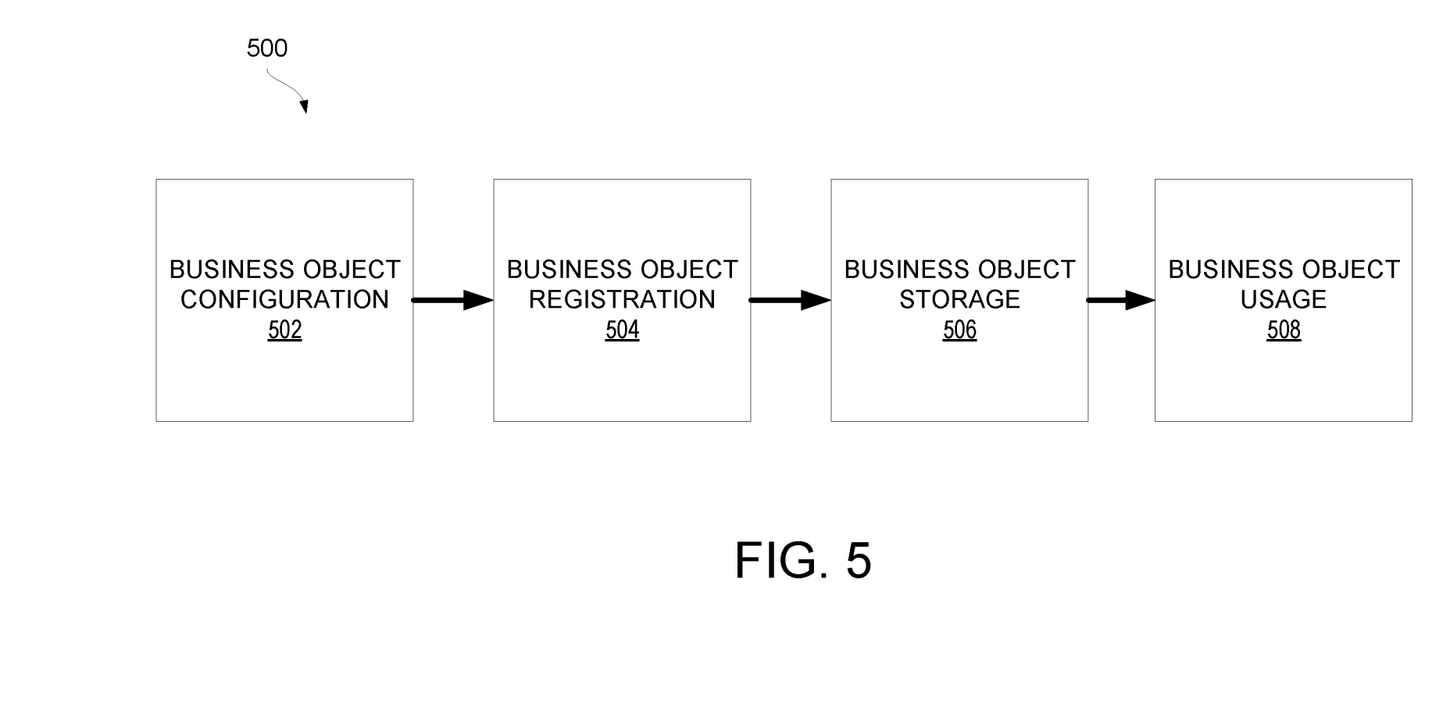
FIG. 5 illustrates a functional block process of the business object included in the computing device of FIG. 1, in accordance with an embodiment of the present disclosure.

FIG. 5 is a functional block process 500 of business object 110 in accordance with an embodiment of the present disclosure.

In one or more embodiments, business object configuration 502 may configure business object 110. Business object 110 may define what data to be retrieved from database 104 by a user. Each user may define business object 110 per a specified request from each user. Business object 110 may define a name to use for a field of the data to be retrieved from database 104 for a user. For example, business object 110 can specify a data field to fetch data in database 104 and specify a field name for the data to be fetched for a user. Business object 110 may provide definitions to create a structured view of an underlying unstructured data in database 104. In an example, business object 110 can be configured in a JSON file.

In one or more embodiments, business object registration 504 may register business object 110 with data engine 106. For example, when business object 110 is configured for a user, business object 110 can be sent to data engine 106 for registration.

In one or more embodiments, business object storage 506 may store business object 110 in storage 112. In an example, storage 112 can be an in-memory cache. In other examples, storage 112 can be any other suitable memory. Business object storage 506 may store the definitions in business object 110 in storage 112.

In one or more embodiments, business object usage 508 may retrieve and use data based on business object 110 for the user. Business object usage 508 may fetch the data and return the data to the user using the field names specified in the definitions of business object 110. Business object usage 508 may present the data in the view defined in business object 110. Business object usage 508 may present a structured view of an underlying unstructured data in database 104 to the user based on business object 110.

Figure 6:
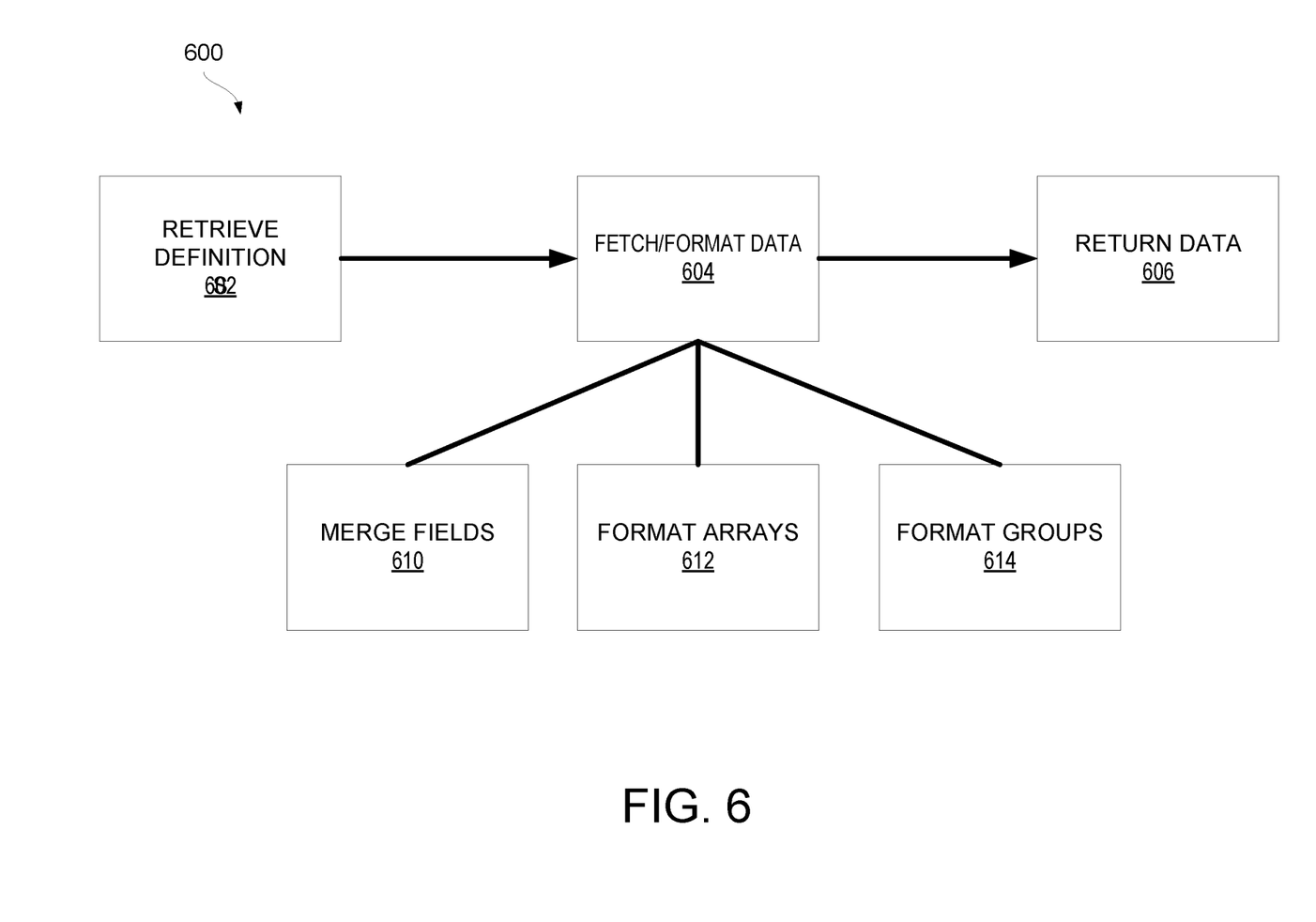
FIG. 6 is another example flowchart depicting operational steps of the data engine included in the computing device of FIG. 1, in accordance with an embodiment of the present disclosure.

FIG. 6 is another example flowchart 600 depicting operational steps of data engine 106 in accordance with an embodiment of the present disclosure.

In step 602, data engine 106 retrieves definitions defined in business object 110 for data access when a user calls to access data from database 104 using business object 110. Business object 110 may describe what data to be retrieved from database 104 by the user. Business object 110 may define a name to use for a field of the data to be retrieved from database 104 for the user. Business object 110 may specify a data field to fetch data in database 104 and specify a field name for the data to be fetched for the user. Business object 110 may provide definitions to create a structured view of an underlying unstructured data in database 104. When the user calls a data access to database 104 based on business object 110, data engine 106 may retrieve the definitions defined in business object 110 from storage 112. Data engine 106 may retrieve the definitions defined in business object 110 for data access when a user calls to access data from database 104 using business object 110.

In step 604, data engine 106 fetches and formats the data retrieved from database 104. Data engine 106 may fetch data from storage 112 per the field of business object 110. Data engine 106 may apply field type conversions specified in business object 110. For example, in step 610, data engine 106 may merge multiple fields into one field in the retrieved data. In step 612, data engine 106 may format an array for a collection of data values from multiple tables. Array content can come from multiple tables. The multiple tables with data related to a root table can be formatted in an array based on business object 110. In step 614, data engine 106 may format a group which includes multiple fields under a single name. Group content may come from multiple tables.

In step 606, data engine 106 returns the data to the user. Data engine 106 may present the data in the view defined in business object 110. Data engine 106 may present a structured view of an underlying unstructured data in database 104 to the user based on the definitions pre-defined by the user in business object 110.

Figure 7:
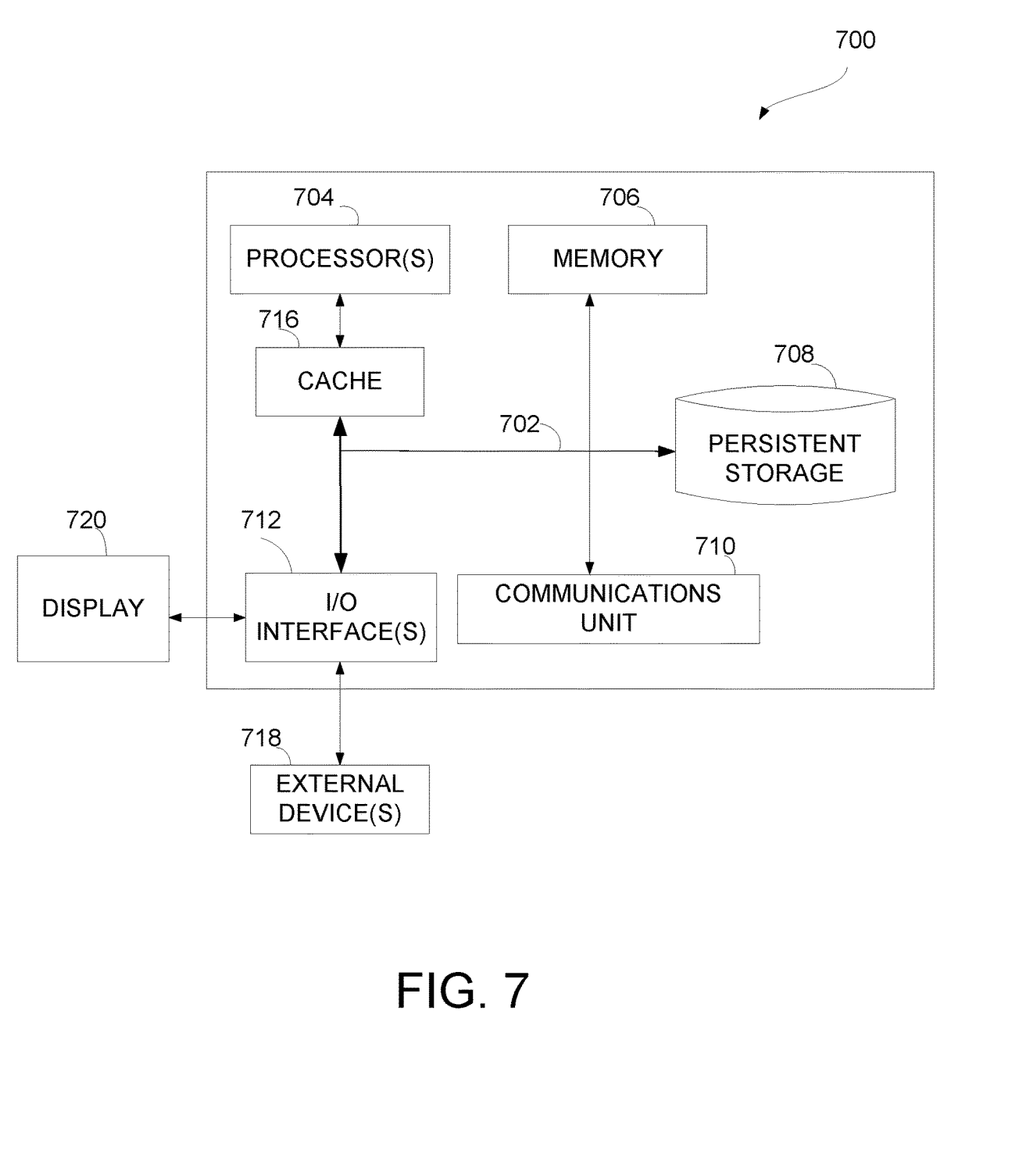
FIG. 7 is a block diagram of components of the computing device of FIG. 1, in accordance with an embodiment of the present disclosure.

FIG. 7 depicts a block diagram 700 of components of computing device 102 in accordance with an illustrative embodiment of the present disclosure. It should be appreciated that FIG. 7 provides only an illustration of one implementation and does not imply any limitations with regard to the environments in which different embodiments may be implemented. Many modifications to the depicted environment may be made.

Computing device 102 may include communications fabric 702, which provides communications between cache 716, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses or a crossbar switch.

Memory 706 and persistent storage 708 are computer readable storage media. In this embodiment, memory 706 includes random access memory (RAM). In general, memory 706 can include any suitable volatile or non-volatile computer readable storage media. Cache 716 is a fast memory that enhances the performance of computer processor(s) 704 by holding recently accessed data, and data near accessed data, from memory 706.

Data engine 106 and business object 110 may be stored in persistent storage 708 and in memory 706 for execution by one or more of the respective computer processors 704 via cache 716. In an embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices. In these examples, communications unit 710 includes one or more network interface cards. Communications unit 710 may provide communications through the use of either or both physical and wireless communications links. Data engine 106 and business object 110 may be downloaded to persistent storage 708 through communications unit 710.

I/O interface(s) 712 allows for input and output of data with other devices that may be connected to computing device 102. For example, I/O interface 712 may provide a connection to external devices 718 such as a keyboard, keypad, a touch screen, and/or some other suitable input device. External devices 718 can also include portable computer readable storage media such as, for example, thumb drives, portable optical or magnetic disks, and memory cards. Software and data used to practice embodiments of the present invention, e.g., data engine 106 and business object 110 can be stored on such portable computer readable storage media and can be loaded onto persistent storage 708 via I/O interface(s) 712. I/O interface(s) 712 also connect to display 720.

Display 720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
   receiving, by one or more processors, a request from a user for accessing data in a database based on a business object, the business object being a configuration file that defines the data and how the data is to be retrieved from the database by the user;
   retrieving, by one or more processors, the business object;
   retrieving, by one or more processors, a definition specified in the business object about what data and how the data is to be retrieved from the database and is to be presented to the user, wherein the definition defines a level of detail of the data to present to the user;
   determining, by one or more processors, based on the business object, a location in the database to get the data;
   retrieving, by one or more processors, the data from the database based on the business object;
   formatting, by one or more processors, the data based on the business object;
   performing, by one or more processors, a post process on the data based on the business object; and
   returning, by one or more processors, the data to the user by presenting a structured view of the data based on the definition specified in the business object.

2. The computer-implemented method of claim 1, wherein the business object specifies the location to get the data from the database, the location including tables and columns in the database and linkages among the tables and columns.

3. The computer-implemented method of claim 1, wherein formatting the data includes generating an array and a group in the data.

4. The computer-implemented method of claim 1, wherein performing the post process including merging fields of the data.

5. The computer-implemented method of claim 1, wherein the database is a non-relational database including unstructured data, wherein returning the data includes presenting the structured view of the unstructured data.

6. A computer program product comprising:
   one or more computer readable storage media, and program instructions collectively stored on the one or more computer readable storage media, the program instructions comprising:
   program instructions to receive a request from a user for accessing data in a database based on a business object, the business object being a configuration file that defines the data and how the data is to be retrieved from the database by the user;
   program instructions to retrieve the business object;
   program instructions to retrieve a definition specified in the business object about what data and how the data is to be retrieved from the database and is to be presented to the user, wherein the definition defines a level of detail of the data to present to the user;
   program instructions to determine, based on the business object, a location in the database to get the data;
   program instructions to retrieve the data from the database based on the business object;
   program instructions to format the data based on the business object;
   program instructions to perform a post process on the data based on the business object; and
   program instructions to return the data to the user by presenting a structured view of the data based on the definition specified in the business object.

7. The computer program product of claim 6, wherein the business object specifies the location to get the data from the database, the location including tables and columns in the database and linkages among the tables and columns.

8. The computer program product of claim 6, wherein instructions to format the data include instructions to generate an array and a group in the data.

9. The computer program product of claim 6, wherein instructions to perform the post process includes instructions to merge fields of the data.

10. The computer program product of claim 6, wherein the database is a non-relational database including unstructured data, wherein instructions to return the data include instructions to present the structured view of the unstructured data.

11. A computer system comprising:
one or more computer processors, one or more computer readable storage media, and program instructions stored on the one or more computer readable storage media for execution by at least one of the one or more computer processors, the program instructions comprising:
program instructions to receive a request from a user for accessing data in a database based on a business object, the business object being a configuration file that defines the data and how the data is to be retrieved from the database by the user;
program instructions to retrieve the business object;
program instructions to retrieve a definition specified in the business object about what data and how the data is to be retrieved from the database and is to be presented to the user, wherein the definition defines a level of detail of the data to present to the user;
program instructions to determine, based on the business object, a location in the database to get the data;
program instructions to retrieve the data from the database based on the business object;
program instructions to format the data based on the business object;
program instructions to perform a post process on the data based on the business object; and
program instructions to return the data to the user by presenting a structured view of the data based on the definition specified in the business object.

12. The computer system of claim 11, wherein the business object specifies the location to get the data from the database, the location including tables and columns in the database and linkages among the tables and columns.

13. The computer system of claim 11, wherein instructions to format the data include instructions to generate an array and a group in the data.

14. The computer system of claim 11, wherein the database is a non-relational database including unstructured data, wherein instructions to return the data include instructions to present the structured view of the unstructured data.

* * * * *